US006423399B1

(12) United States Patent
Endo et al.

(10) Patent No.: US 6,423,399 B1
(45) Date of Patent: *Jul. 23, 2002

(54) LASER-MARKING MEDIUM

(75) Inventors: Norio Endo; Teruto Isonaga, both of Chuo-Ku; Atsuya Ozawa, Shinjuku-Ku; Kazuyoshi Hayashi, Shinjuku-Ku; Koji Shimizu, Shinjuku-Ku; Masahiro Shimoyamada, Shinjuku-Ku, all of (JP)

(73) Assignees: Karin Beer Kabushiki Kaisha; Dai Nippon Printing Co., Ltd., both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 08/834,425

(22) Filed: Apr. 16, 1997

(30) Foreign Application Priority Data

Apr. 18, 1996 (JP) ............................................ 8-121049

(51) Int. Cl.[7] ............................ B32B 3/00; B32B 5/16; B32B 7/00

(52) U.S. Cl. ....................... 428/206; 428/207; 428/208; 428/689; 428/913

(58) Field of Search ............................... 428/323, 64.4, 428/206, 207, 208, 689, 913; 430/945, 270

(56) References Cited

U.S. PATENT DOCUMENTS

| | | | | |
|---|---|---|---|---|
| 4,515,867 A | | 5/1985 | Bleacher et al. | 428/204 |
| 4,808,966 A | * | 2/1989 | Ferlier et al. | 338/214 |
| 5,413,629 A | * | 5/1995 | Yasui et al. | 106/21 R |
| 5,528,280 A | * | 6/1996 | Endo et al. | 347/262 |

FOREIGN PATENT DOCUMENTS

| | | | |
|---|---|---|---|
| EP | 0 113 167 A2 | | 4/1984 |
| EP | 0 443 639 A1 | | 8/1991 |
| EP | 0 447 032 A3 | | 9/1991 |
| EP | 0 447 032 A2 | | 9/1991 |
| EP | 0 771 677 A1 | | 5/1997 |
| GB | 2 240 948 A | * | 8/1991 |
| JP | 63-205291 | * | 8/1988 |
| JP | 5-16581 | | 1/1993 |
| JP | 05-016581 | * | 1/1993 |

* cited by examiner

*Primary Examiner*—Bruce H. Hess
*Assistant Examiner*—B. Shewareged
(74) *Attorney, Agent, or Firm*—Parkhurst & Wendel, L.L.P

(57) ABSTRACT

A laser-marking medium comprises at least a base layer and a masking layer formed on one side of a support element in the stated order. The base layer has laser light absorptivity, and the masking layer contains metal powder and a white pigment. A laser beam applied to the laser-marking medium is absorbed by the base layer having laser light absorptivity, and the base layer heats and breaks, whereby the masking layer in the laser applied region is removed, and a lightness difference is generated between a laser beam non-applied region of the masking layer and the laser beam applied region with the masking layer removed so as to make marks in the laser beam applied region distinctly visible.

10 Claims, 1 Drawing Sheet

LASER-MARKING MEDIUM

BACKGROUND OF THE INVENTION

1. Field of the Invention

The present invention relates to a laser-marking medium, more specifically to a laser-marking medium that which enables marks which are vivid, light resistant, scratch resistant, water resistant, chemical resistant and other properties to be made at high speed by laser light irradiation.

2. Description of the Related Art

As printing methods for printing objects-to-be-printed, such as labels, packaging materials, etc., the printing method, thermal transfer method, ink jet method, etc. have been conventionally used.

The printing method prints by transferring solution-type ink to objects-to-be-printed by impressions of various types. This printing needs bothering operations, such as changes of impressions, supply of ink, adjustment of viscosities, takes time to dry the transferred ink, and has limits to printing on objects-to-be-printed on high speed lines and printing of small lots.

The thermal printing method prints by transferring ink on ink ribbon to objects-to-be-printed through an ink ribbon by a thermal head printer. Different from the above-described printing method, the thermal printing method does not use liquid ink, and accordingly does not require bothersome operations, such as the ink supply, viscosity adjustment, etc. However, the ink ribbon must be periodically replaced, which puts a limit to printing objects-to-be-printed on high speed lines. Shapes of objects-to-be-marked are limited. The thermal printing method increases printing costs in comparison with the printing method.

The ink jet method prints by injecting liquid ink through micronized diameter-nozzles and staying the ink on objects-to-be-printed. The ink jet method can print at high speed and make distinct prints, and accordingly can print objects-to-be-printed on high speed lines and can print small lots. However, on, e.g., high speed lines of filling and packaging food it is disadvantageous in terms of sanitariness that the ink jet method prints information, such as production dates, edible limits, lot numbers, production factories, etc., on objects-to-be-printed, such as labels, packaging materials, etc. Furthermore, the ink jet method is disadvantageous in maintenance, as of ink replacement, etc. which is attributable to its mechanism. The use of solvent-based ink for quick drying printed ink tends to coagulate the nozzles with a resulting in defective prints. On the other hand, the use of water-soluble ink, which does not easily coagulate, lowers the water resistance of prints.

Furthermore, in a case that objects-to-be-printed are labels for bottles for beverages, severe requirements are made of the objects-to-be-printed themselves in addition to the above-described disadvantages of the respective printing methods. That is, generally bottle loading lines for beverages are sped, and many of the bottles are hot-loaded, and the loaded, sealed and labelled bottles are carried on conveyors. During this process, the bottles collide with one another; often bottle coating liquids for hinding bottle scuffing are applied to the surfaces of the bottles, and furthermore the bottles are often immersed for cooling. Thus, the labels adhered to the bottles are placed in very severe environments. It is required that the labels can be resistant to such environments.

The labels used on the above-described beverage bottles includes, e.g., 1) a label having indications, such as a production date, etc. is printed in advance together with pictures and patterns at a peripheral part thereof, and notches are made in the location for indication when a beverage is loaded;
2) a label having an ink that is colored by irradiating laser beams applied in advance to a label marking region; and
3) a label having in a label marking-region a color ink layer that is able to absorb energy of an applied laser beam at the irradiated parts thereof, and heat and removably break there, laser light being applied to the label marking region to remove the color ink layer in the shapes of letters, marks, etc., whereby a contrast of colors between the removed part and remaining part forms marks.

However, the above-described label 1) has disadvantages that when notches are cut to make indications, breakages are generated, and the label adhered to a bottle tends to easily start breaking, and other disadvantages.

The above-described label 2) has disadvantages that although high-speed marking is possible on the label 2), the colored ink layer has insufficient light resistance and chemical resistance, etc. and has a risk that when exposed to ultraviolet rays, the label 2) may be discolored. To prevent such an occurrence, in a case that an overprint layer is applied to the laser coloring ink layer, when the overprint layer is broken by excessive laser beam irradiation, marks are faded by application of a bottle coating liquid, etc. after the label is adhered. Disadvantageously, this treatment makes it difficult to adjust conditions of irradiating laser beams.

The above-described label 3) can be marked at high speed, but the marks lack visibility, and the colored ink layer at marking parts is completely removed. Accordingly, even if an overprint layer, for example, is formed on the color ink layer, the support element at the marking parts is exposed, and disadvantageously the marking parts have reduced scratch resistance and water resistance.

SUMMARY OF THE INVENTION

In view of the above-described circumstances, the present invention was made. An object of the present invention is to provide a laser-marking medium that can be distinctly marked by irradiating laser beams at high speed, and has good light resistance, scratch resistance, water resistance, chemical resistance, etc.

To achieve the above-described object, the laser-marking medium according to the present invention comprises laser-marking medium comprising a support element; a base layer formed on the support element and being capable of absorbing a laser beam; and a masking layer formed on the base layer and having a lightness distinctly different from that of the base layer.

In the laser-marking medium according to the present invention, the masking layer contains metal powder by 3–10 weight %.

In the laser-marking medium according to the present invention, the metal powder is aluminium, and the aluminium powder is of non-leafing type.

In the laser-marking medium according to the present invention, the white pigment is titanium oxide.

In the laser-marking medium according to the present invention, the base layer contains carbon black.

The laser-marking medium according to the present invention further comprises an overprint layer formed on the masking layer.

In the above-described invention, a laser beam applied to the laser-marking medium is absorbed by the base layer having a laser light beam-absorbing power, and then the base layer heats and breaks to remove the masking layer in the laser beam applied region, whereby a lightness difference is generated between the laser beam non-applied region of the masking layer containing metal powder and a white pigment, and the laser applied region where the masking layer is removed to make marks in the laser applied region distinctly visible.

DETAILED DESCRIPTION OF PREFERRED EMBODIMENTS

The most preferable embodiment of the present invention will be explained.

Figure 1:
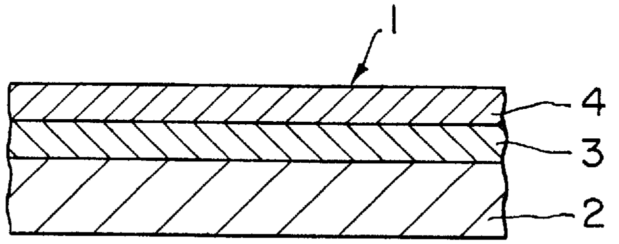
FIG. 1 is a schematic sectional view of the laser-marking medium according to a first embodiment of the present invention.

FIG. 1 is a schematic sectional view of a laser-marking medium according to a first embodiment of the present invention. In FIG. 1, the laser-marking medium 1 comprises a support element 2, a base laser 3 formed on the support element 2, and a masking layer 4 formed on the base layer 3.

The support element 2 of the laser-marking medium 1 can be formed of a single body of a paper sheet, a paper board or others; or can be formed of such a single body having on the side of the base layer a laminated aluminium foil, or metalized aluminium, or can be a single body, a laminated body or others of resin film.

The base layer 3 of the laser-marking medium 1 absorbs laser beams applied to a marking region, and heats and breaks, whereby the masking layer 4 in the laser beam applied region would be removed. At the same time, the base layer 3 remaining on the support element 2 protects the support element 2, whereby light resistance, scratch resistance, water resistance, chemical resistance, etc. of the marking region can be maintained.

The base layer 3 can be a layer containing a carbon black that has a laser beam absorbing power, and a binder. In this case, the binder can be a polyamide-based resin, a phenol-based resin, an alkyd-based resin, a vinyl-based resin, an acrylic-based resin, nitrocellulose or others; or a mixture of them; or others. It is preferable that a content of the carbon black of the base layer 3 is 5–15 weight %. When the content of the carbon black is less than 5 weight %, the base layer has insufficient laser beam absorptivity, and the above-described removal of the masking layer 4 cannot be satisfactory. When the content of the carbon black is more than 15 weight %, the base layer 3 excessively heats and breaks by laser beam absorption. As a result, marks are indistinct, and an adversely smaller amount of the base layer 3 in the marking region remains, which unpreferably leads to lowered light resistance, scratch resistance, water resistance, chemical resistance, etc. of the marking region.

The base layer 3 may be a color layer containing a desired coloring agent having a laser beam-absorbing power in place of the carbon black in a binder as described above. The base layer 3 may be a color layer containing a desired coloring agent in addition to the carbon black having a laser beam-absorbing power and the binder as described above. In this case, the coloring agent may be a known pigment dye or others.

The masking layer 4 of the laser-marking medium 1 has a low laser beam-absorbing power, and functions to generate a visible lightness difference between the marking region where the base layer 3 is exposed with the masking layer 4 removed by the laser beam irradiation as described above, and a laser beam non-applied region of the masking layer 4.

The masking layer 4 can be a layer containing metal powder, a white color pigment and a binder. The binder can be a polyamide-based resin, a phenol-based resin, an alkyd-based resin, a vinyl-based resin, an acrylic-based resin, a nitrocellulose or others; or a mixture of them; or others. The metal power can be one or two of non-leafing-type aluminium flake powder, bronze powder, pearl, gold powder, silver powder, copper powder, zirconium, iron powder, etc. It is preferable that such metal powders are contained in the masking layer 4 by 3–10 weight %. When the content of the metal powder is less than 3 weight %, the masking of the masking layer 4 is insufficient, and when the content of the metal powder exceeds 10 weight %, unpreferably excessive heating takes place when the masking layer 4 is removed in making by laser beam irradiation. The white pigment can be one of two of titanium oxide, zinc oxide, calcium carbonate, clay, barium sulfate, alumina white, etc. It is preferable that the white pigment is contained in the masking layer 4 by 10–40 weight %.

The "non-leafing-type aluminum flake powder" mentioned in the immediately proceeding paragraph is known in the art as a powder that does not rise to the surface of a coating film and has a silver and white metallic appearance.

Figure 2:
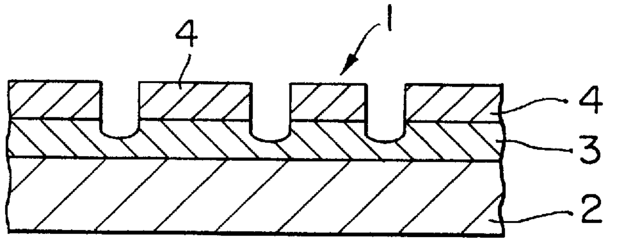
FIG. 2 is a schematic sectional view of the laser-marking medium shown in FIG. 1, which shows a marked state hereof.

When the above-described laser-marking medium 1 is marked by laser beam irradiation, a laser beam applied to the masking layer 4 passes voids in the metal powder and the white pigment in the masking layer 4, or is reflected on the metal powder or the white pigment and passes the masking layer 4 to reach the base layer 3. The laser beam applied to the marking region is absorbed by the base layer 3 and heats and breaks the base layer 3, and as shown in FIG. 2, the masking layer 4 in the laser beam applied region is removed, a part of the base layer 3 remains on the support element 2. Thus a lightness difference is generated between the base layer 3 in the marking region and the laser beam non-applied region of the masking layer 4 to make marks in the laser beam-applied region distinctly visible. In the laser beam-applied region, which is the marking region, the part of the base region 3 remains, protecting the support element 2, whereby the marking region, even after being marked, still maintains high light resistance, scratch resistance, water resistance, chemical resistance, etc.

Figure 3:
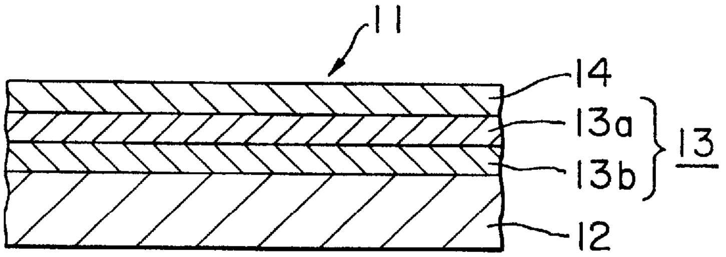
FIG. 3 is a schematic sectional view of the lase-marking medium according to a second embodiment of the present invention.

FIG. 3 is a schematic sectional view of the laser-marking medium according to a second embodiment of the present invention. In FIG. 3, the laser-marking medium 11 according to the present invention comprises a base layer 13 and a masking layer 14 laminated on a support element 12. The base layer 13 has a laminated structure including a color layer **13*b* formed on the side of the support element 12, and a laser beam-absorbing layer 13***a* formed on the side of the masking layer 14.

The laser-marking medium 11 according to the second embodiment is different from that according to the first embodiment in that, as described above, the base layer 13 comprises two layers of the laser beam-absorbing layer 13*a* and the color layer 13*b*. In the base layer 13 the laser beam-absorbing layer 13*a* has a role of absorbing an applied laser beam, and heating and breaking to remove the masking layer 14 in the laser beam-applied region. The color layer 13*b* remains on the support element 12 in the laser beam-applied region to generate a lightness difference between the laser beam-applied region and the laser-beam non-applied region so that the color layer 13*b* makes marks in the laser beam-applied region distinctly visible, and protects the base layer 13 to maintain light resistance, scratch resistance, water resistance, chemical resistance, etc. of the marking region after being marked.

The laser beam-absorbing layer 13*a* comprising the base layer 13 is not specifically limited, as long as the layer 13 contains a substance having a laser beam-absorbing power in a binder, but more preferably is a layer containing a carbon black. In this case, a binder can be the same as that for use in the base layer 3 of the laser-marking medium 1 according to the first embodiment of the present invention. It is preferable that a content of the carbon black of the laser beam-absorbing layer 13*a* is 5–15 weight %. When the content of the carbon black is less than 5 weight %, the laser beam-absorbing layer 13*a* has an insufficient laser beam-absorbing power, and therefore the masking layer 14 in the marking region cannot be sufficiently removed. When the content of the carbon black is more than 15 weight %, the heating/breakage due to laser beam absorption of the laser beam-absorbing layer 13*a* is excessive, and marks become indistinct, and unpreferably the masking layer 14 excessively heats to break.

The color layer 13*b* composing the base layer 13 can be a layer containing, for toning a color, a coloring agent other than the carbon black which has a low laser beam absorbing power. The coloring agent may be any of the known pigments, dyes, etc, and a content of the coloring agent of the color layer 13*b* can be 5–15 weight %.

The support element 12 and the masking layer 14 composing the laser-marking medium 11 can be the same as those of the laser-marking medium 1 according to the first embodiment, and therefore their explanation is not repeated here.

Figure 4:
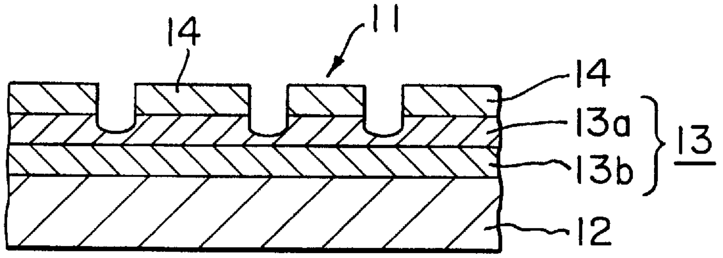
FIG. 4 is a schematic sectional view of the lase-marking medium shown in FIG. 3, which shows a marked state thereof.

When the above-described laser-marking medium 11 is marked by laser beam irradiation, a laser beam applied to the masking layer 14 passes voids in a metal powder and a white pigment in the masking layer 14, or is reflected on the metal powder or the white pigment and passes the masking layer 14 to reach the base layer 13. The laser beam applied to a marking region is absorbed by the base layer 13 and heats and breaks the base layer 13, and as shown in FIG. 4, the masking layer 14 in the laser beam applied region is removed. As a result, the color layer 13*b* composing the base layer 13 is left on the support element 12. Thus a lightness difference is generated between the color layer 13*b* of the base layer 13 in the marking region and the laser beam non-applied region of the masking layer 14 to make marks in the laser beam-applied region distinctly visible. In the laser beam-applied region, which is the marking region, the color layer 13*b* of the base region 13 is left, and protects the support element 12, whereby the marking region, even after being marked, still maintains high light resistance, scratch resistance, water resistance, chemical resistance, etc.

Figure 5:
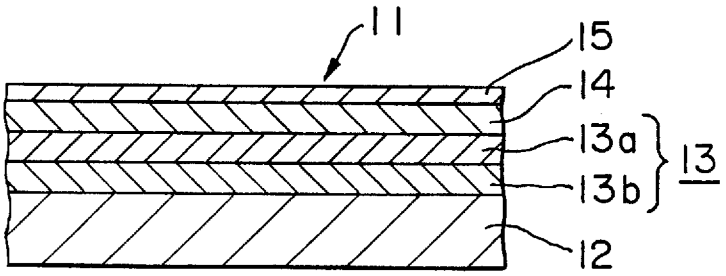
FIG. 5 is a schematic sectional view of the laser-marking medium according to the second embodiment.

For required scratch resistance, etc., the laser-marking medium 14 according to the second embodiment can include an overprint layer 15 on the masking layer 14 as shown in FIG. 5. The overprint layer 15 can be formed of nitrocellulose, polyamide resin, wax, a rosin-based resin, a maleic acid-based resin, a mixture of them or others. The overprint layer 15 may be, of course, formed on the masking layer of the laser-marking medium according to the first embodiment shown in FIG. 1.

The laser-marking medium 11 according to the present invention includes the masking layer 14 forming a laminated structure of two or more layers having metal powder contents different from each other or containing different kinds of metal powders.

The laser-marking medium 11 according to the present invention can be desired pictures, patterns, etc. marked in the region other than a marking region.

The laser that can be used in marking the laser-marking medium 11 according to the present invention is exemplified by a carbon dioxide gas laser having a 10.6 μm wavelength. The laser beams of this wavelength are effectively absorbed by the carbon black, but are not much absorbed by metal powder or white pigments, nor much absorbed by coloring agents other than the carbon black. Accordingly, the laser beams of this wavelength have an advantage that calories generated in the above-described marking are small. This carbon dioxide gas laser can adjust an irradiation intensity of the laser to be 0.5–2.0 $J/cm^2$. Output of this laser is adjusted to concentrate for application to patterns of letters, etc., whereby the base layer absorbs the laser beams, heats, melts and mists, or heats, decomposes and ashes, whereby the masking layer 14 can be removed in the patterns.

EXAMPLES

Then, examples of the present invention will be further detailed.

Example 1

The base layer (thickness: 1 μm) was formed of black ink (The Inktec Co.) containing a polyamide-based resin as a binder, and a carbon black by 12 weight % on an aluminium-metalized surface of an aluminium-metalized paper sheet (Honshu Seishi K.K.) as the support element by gravure printing.

Then, the masking layer (thickness: 1 μm) was formed of on the base layer by gravure printing, using a polyamide-based resin as a binder, and a masking film ink (The Inktec K.K.) containing 6 weight % of non-leafing-type aluminium flake powder a 12 μm-particle diameter and 30 weight % of titanium oxide as a white pigment. Furthermore, on the masking layer, an about 1 μm-thick overprint layer (OP layer) was formed on the masking layer by gravure printing, using an overprint varnish containing nitrocellulose by 18 weight %, and thus the laser-marking medium having the following laminated structure was fabricated.

OP layer/masking layer/base layer (carbon black)/aluminium metalized paper sheet

Example 2

The laser-marking medium of the following laminated structure was fabricated in the same way as in Example 1 except that in place of the black ink containing the carbon black, a tone black ink (The Inkteck K.K.) containing a polyamide-based resin as a binder and a yellow, purple and indigo organic pigments (content: 10 weight %) was used.

OP layer/masking layer/based layer (toned black)/aluminium metalized paper sheet Example 3

A toned black color layer (thickness: 1 μm) was formed by gravure printing on an aluminium metalized surface of an aluminium metalized paper sheet, using a toned black ink (The Inkteck K.K.), and on the color layer a laser beam absorbing layer (thickness: 1 μm) was formed by gravure printing, using the same black ink (The Inkteck K.K.) as in Example 1. Thus, the base layer of the two-layer structure of the color layer and the laser beam-absorbing layer were formed on the aluminium metalized paper sheet as the support element.

Then, a masking layer (thickness: 1 μm) was formed on the laser beam-absorbing layer by gravure printing, using the same masking layer ink (The Inktec K.K.) as in Example 1. An overprint layer (OP layer) of an about 1 μm thickness was formed on the masking layer by gravure printing, using an overprint varnish containing nitrocellulose by 18 weight %, and thus the laser-marking medium having the following laminated structure was fabricated, which is the same as in FIG. 5.

OP layer/masking layer/base layer (carbon black/toned black)/aluminium metalized paper sheet Example 4

The laser-marking medium of the following laminated structure way fabricated in the same was as in Example 3 except that in place of the toned black ink, a purple ink (The Inkteck K.K.) containing a polyamide-based resin as a binder and a purple pigment (content: 10 weight %).

OP layer/masking layer/base layer (carbon black/purple)/aluminium metalized paper sheet (Control 1)

The base layer (thickness: 1 μm) was formed on an aluminium metalized surface of an aluminium metalized paper sheet (Honshu Seishi K.K.) as the support element by gravure printing, using a black ink (The Inkteck K.K.) containing a polyamide-based resin as a binder and a carbon black by 12 weight %.

Then, an overprint layer (OP layer) of an about 1 μm-thickness was formed on the base layer by gravure printing, using an overprint varnish containing nitrocellulose by 18 weight %, and thus the laser-marking medium having the following laminated structure was fabricated.

OP layer/base layer (carbon black)/aluminium metalized paper sheet (Control 2)

A laser-coloring layer (thickness: 1 μm) was formed on an aluminium metalized surface of an aluminium metalized paper sheet (Honshu Seishi K.K.) as the support element by gravure printing, using a leuco-based laser-coloring ink containing a coloring agent, a development agent and a sensitization agent.

An about 1 μm-thickness overprint layer (OP layer) was formed on the laser-coloring layer by gravure printing, using an overprint varnish containing nitrocellulose by 19 weight %, and the laser-marking medium having the following laminated structure was fabricated.

OP layer/laser-coloring layer/aluminium metalized paper sheet.

The following evaluation tests were made on the laser-marking mediums fabricated above (Examples 1 to 4, and Controls 1 and 2), and the results are shown in TABLE 1 below.

Marking Evaluation

The laser-marking mediums were marked on the side of the OP layers through a metal mask by one-shot irradiation by a TEA carbon dioxide gas laser (LASERMARK-920 by Lumonics Co., Canada) in a 0.8 J/cm$^2$ energy density, and letter visibility of the irradiated samples were evaluated based on the following evaluation standard.

Evaluation Standard

◎: Visibility is very good

○: Good

Δ: Recognizable

X: Unrecognizable

Heating upon Marking Evaluation

While glass bottles with the laser-marking mediums applied to the sides thereof were being conveyed at 700 bottles/minute, the laser-marking mediums were irradiated at a 0.8 J/cm$^2$ energy density by a TEA carbon dioxide gas laser (LASERMARKS-920 by Lumonics Co., Canada). Temperatures on the marked surfaces were measured by non-contact-type infrared thermometer (Inframetrics K.K., PM-300).

Bottle Coating Resistance Evaluation

A silicone-based bottle coating liquid is applied to the laser-marking mediums marked in the above-described marking mediums, and states of the coatings were observed based on the following standard.

Evaluation Standard

◎: Completely uncorroded

○: Substantially uncorroded

Δ: Partially corroded; the aluminium metalized surface of the support element exposed X: Completely corroded; the aluminium metalized surface of the support element exposed Weathering Test Visible light and ultraviolet were applied to the laser-marking mediums marked in the above-described marking evaluation for 24 hours at a 320 W/m$^2$ output by a xenon weather meter (Suga Shinken-ki K.K.), and states of the surfaces were observed and evaluated based on the following standard.

Evaluation Standard

◎: Unchanged after irradiation

X: Both marking regions and non-marking regions were discolored to yellow, and parts of marks vanished

TABLE 1

| Laser-Marking Medium | Marking evaluation | Heating on Marking ° C. | Bottle Coat-Resistance | Weather-ability |
|---|---|---|---|---|
| Example 1 | ◎ | 230–250 | ○ | ◎ |
| Example 2 | ○ | 230–250 | ○ | ◎ |
| Example 3 | ◎ | 230–250 | ◎ | ◎ |
| Example 4 | ◎ | 230–250 | ◎ | ◎ |
| Control 1 | X | 230–250 | ◎ | ◎ |
| Control 2 | ○ | 70–100 | X | X |

As shown in TABLE 1, the laser-marking mediums according to Examples 1 to 4 of the present invention have good marking, bottle coating resistance and weatherability. The heating upon marking was practically insignificant in the laser-marking mediums according to Examples 1 to 4 of the present invention.

In contrast to this, the laser-marking medium according to Control 1 has good bottle coating resistance and weatherability, but marking was impractically poor.

The laser-marking medium according to Control 2 has good marking and low heating upon marking, but had disappearances of color and mark due to the bottle coating liquid. In connection with the weatherability, both marking region and non-marking region were discolored to yellow, and partial mark disappearance was observed.

As detailed above, the laser-marking medium according to the present invention comprises the base layer having at least a laser beam-absorbing power, and the masking layer containing a metal powder and a white pigment are formed on one of the surfaces of the support element in the stated order. A laser beam-applied to the laser-marking medium is absorbed by the base layer having a laser beam-absorbing power, and the base layer heats and breaks to remove the masking layer in the laser beam-applied region. The masking layer containing the metal powder and a white pigment has a lightness difference with respect to the base layer in the laser beam non-applying region, whereby marks in the laser beam applying region are distinctly visible. In the laser beam-applying region, which is a marking region, the base layer remains to protect the support element, whereby, even after marking, high light resistance, scratch resistance, water resistance, chemical resistance, etc. can be retained.

What is claimed is:

1. A laser-marking medium comprising:

a support element;

a base layer containing carbon black formed on the support element and capable of absorbing a laser beam; and a masking layer including a non-leafing aluminum flake powder formed on the base layer and having a response to light distinctly different from that of the base layer.

2. A laser-marking medium according to claim 1, wherein the base layer contains a carbon black by 5–15 weight %.

3. A laser-marking medium comprising:

a support element;

a base layer formed on the support element and capable of absorbing a laser beam; and a masking layer including a non-leafing aluminum flake powder and a white pigment formed on the base layer and having a response to light distinctly different from that of the base layer.

4. A laser-marking medium according to claim 3, wherein the masking layer contains the metal powder by 3–10 weight %.

5. A laser-marking medium according to claim 3, wherein the white pigment is titanium oxide.

6. A laser-marking medium according to claim 3, wherein the base layer includes a laser beam-absorbing layer positioned on a side of the masking layer, and a color layer positioned on a side of the support element.

7. A laser-marking medium according to claim 6, wherein the laser beam absorbing layer contains a carbon black.

8. A laser-marking medium according to claim 7, wherein the laser beam-absorbing layer contains carbon black by 5–15 weight %.

9. A laser-marking medium according to claim 6, wherein the color layer includes a coloring agent having low laser beam absorptivity.

10. A laser-marking medium according to claim 3, further comprising an overprint layer formed on the masking layer.

* * * * *

UNITED STATES PATENT AND TRADEMARK OFFICE

CERTIFICATE OF CORRECTION

PATENT NO. : 6,423,399 B1

DATED : July 23, 2002

INVENTOR(S) : Norio Endo et al.

It is certified that error appears in the above-identified patent and that said Letters Patent is hereby corrected as shown below:

Title page,
Item [73], Assignees:, change "Karin" to -- Kirin --.

Signed and Sealed this

First Day of October, 2002

*Attest:*

JAMES E. ROGAN

*Attesting Officer*

*Director of the United States Patent and Trademark Office*